Oct. 30, 1945.  P. L. LOEWE ET AL  2,388,165
LAWN MOWER
Filed July 22, 1944    4 Sheets-Sheet 4
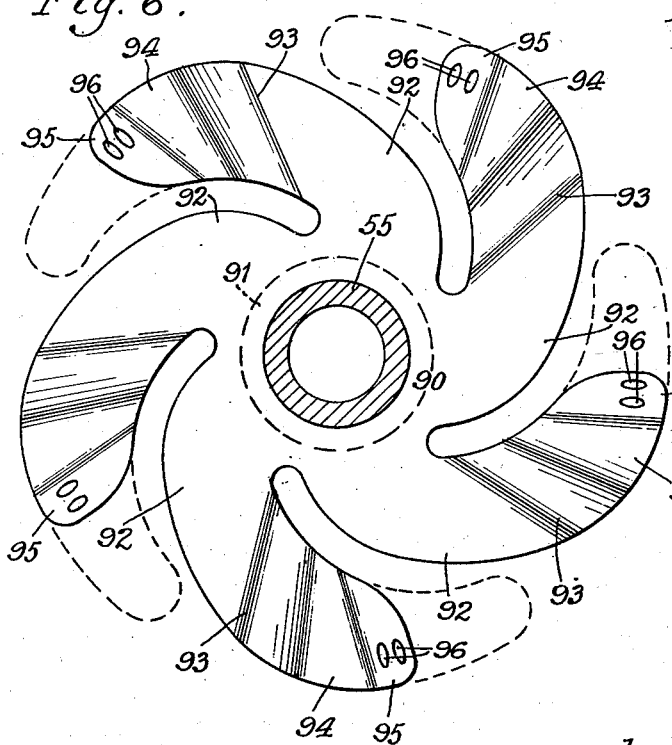
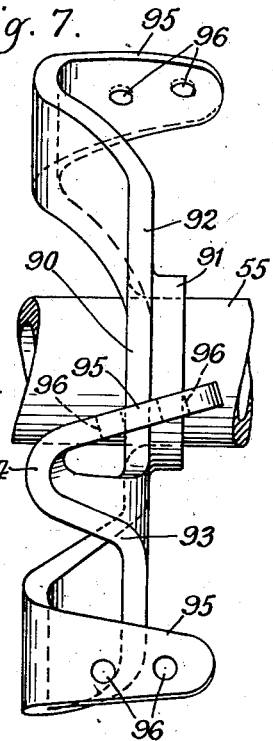
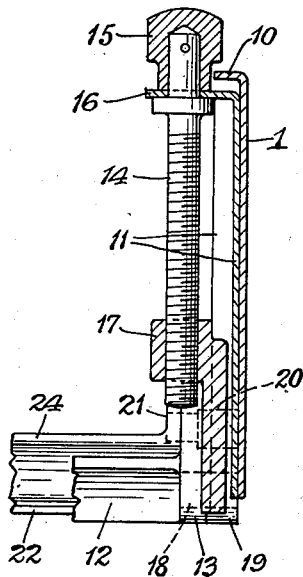
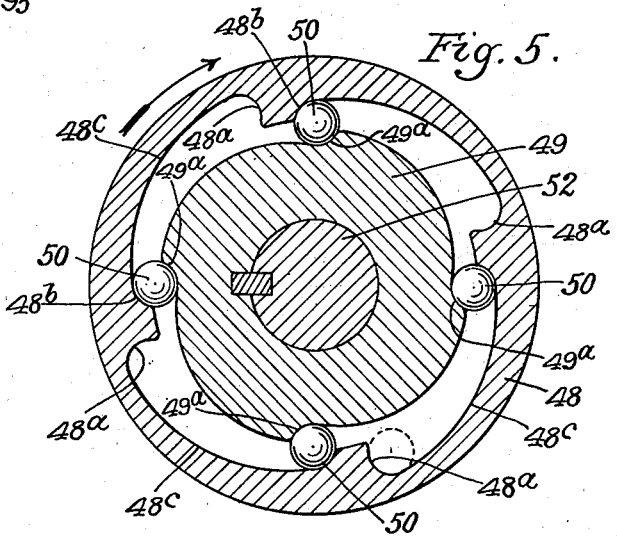
Inventors
Peter L. Loewe
Eugene L. Boyce
by Parker & Carter
Attorneys.

Patented Oct. 30, 1945

2,388,165

UNITED STATES PATENT OFFICE 2,388,165

LAWN MOWER

Peter L. Loewe and Eugene L. Boyce, Chicago, Ill., assignors to H. Goldberg, Chicago, Ill.

Application July 22, 1944, Serial No. 546,112

23 Claims. (Cl. 56—249)

Our invention relates to a lawn mower structure which is adapted to be actuated by any suitable means, for example by a manual handle.

One purpose of our invention is to provide a lawn mower with a cutting height adjustment of extreme range.

Another purpose is to provide a lawn mower with a cutting bar which remains at a definite and predetermined angle in relation to the ground at all adjustments of the cutting bar and reel toward and away from the ground.

Another purpose is to provide a reel and a cutter bar which are readily removable as a unit from the lawn mower.

Another purpose is to provide a reel and cutter bar unit which are free from any transmission of stresses from any part of the lawn mower chassis.

Another purpose is to provide means for permitting the raising and holding of the handle to a substantially vertical position when the lawn mower is stored.

Another purpose is to provide a chassis which is substantially rigid and whose position in relation to the ground is not affected by the raising or lowering of the cutting height of the cutter bar.

Another purpose is to provide means for adjusting the cutting height of the cutter bar and reel without disturbing the drive of the reel.

Another purpose is to provide a simple method for releasing the reel and cutter bar unit from the chassis for removal.

Another purpose is to provide a simple wheel structure.

Another purpose is to provide a dust seal between the wheel structure and the frame.

Another purpose is to enable the reel structure to be removed by pulling out the reel shaft extensions.

Another purpose is to provide an improved thrust relationship between the handle and the chassis and between the point of attachment of the handle and the center of rotation of the chassis.

Another purpose is to provide an improved spider for supporting the cutter blades.

Another purpose is to provide a structure which substantially eliminates the possibility of grass or other such material from interfering with the rotation with the wheel or wheels at the end of the reel shafts.

Other purposes will appear from time to time in the course of the specification and drawings.

We illustrate the invention more or less diagrammatically in the accompanying drawings wherein:

Figure 4 is a section on the line 4—4 of Figure 1;

Figure 5 is a section on an enlarged scale on the line 5—5 of Figure 2;

Figure 6 is a side elevation of the cutter reel spiders illustrating the original form of the blank in dotted line; and Figure 7 is a side elevation of the spider shown in Figure 6.

Like parts are indicated by like symbols throughout the specification and drawings.

Figure 1:
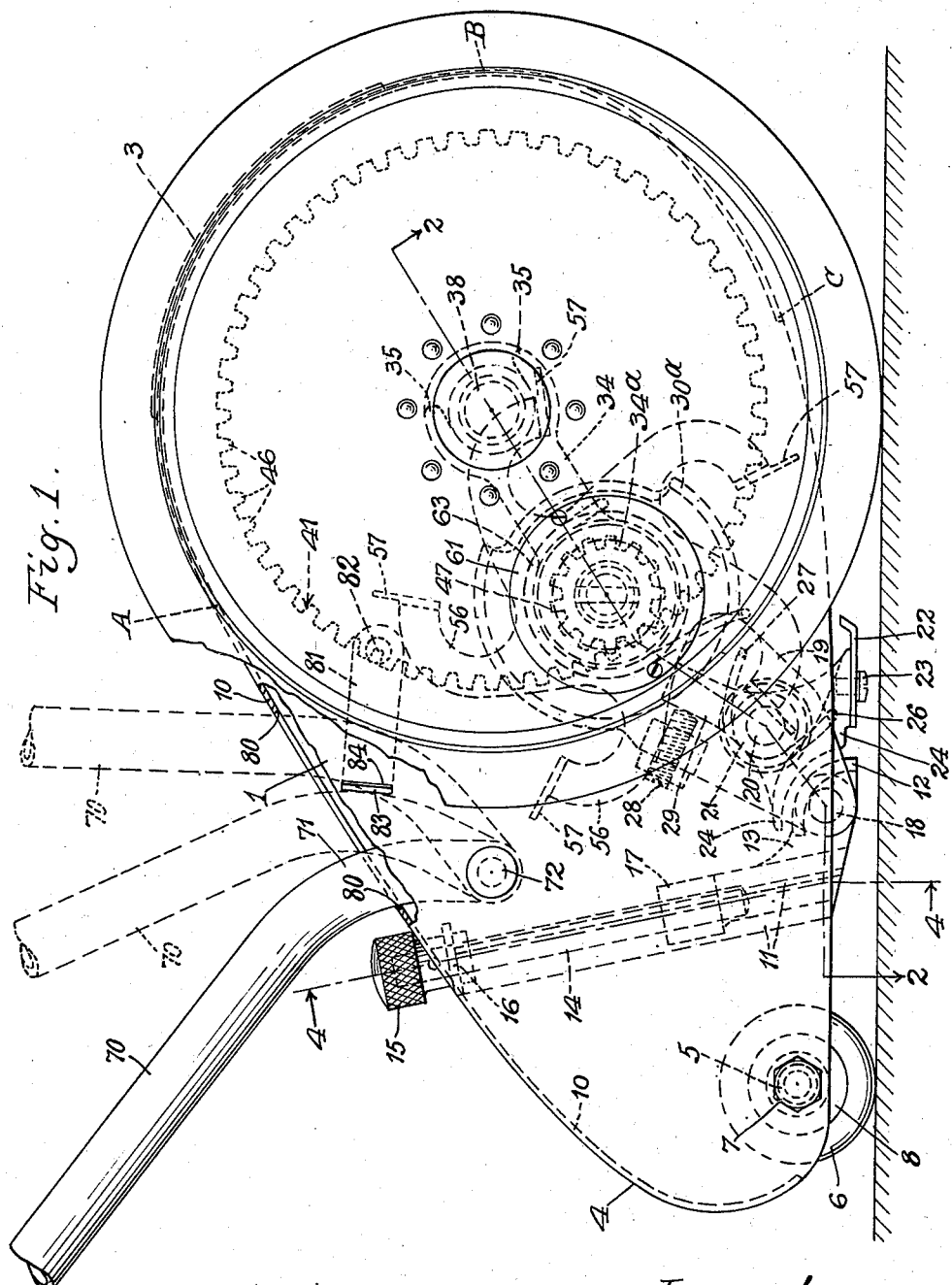
Figure 1 is a side elevation with parts broken away and parts in dotted line.

Referring generally to the structure shown, we illustrate a lawn mower chassis supported at its forward end on a pair of ground engaging reel driving wheels and at its rear end on a roller or rollers. It will be understood that the chassis constitutes an independent unit upon which a cutter assembly, including a cutter reel and a cutter bar, are removably and adjustably mounted, with a drive from the ground engaging wheels to the reel which is uninterrupted by the adjustment of the cutter bar and reel toward and away from the ground.

The chassis includes two side plates 1, spot welded as at 2 to the plate 3. The side plates have rear extensions 4 to which is bolted the tubular support 5 which carries the rear supporting rollers 6. The tube 5 serves to reinforce the ends 4 of the side plates 1. 7 are any suitable supporting bolts and 8 are spacers. 9 are washers separating adjacent rollers 6. Note that the side plates 1 have inwardly turned flanges 10 which increase in width progressively forwardly toward the front of the machine. This increase continues up to the point A. From there on the width of the flange is constant to the point B, and then decreases to zero at C. Thus there is no flange on the bottom part of the side plate which would tend to catch mud.

Welded to the inner face of each side plate rear end 4 is an angle 11. These angles need not go more than part way up the side plates from the bottom. The cross bar 12 has a rear extension 13 provided with a slot 13a which slides along the angle 11. The bar 12 and its extensions may be a casting and may be moved up and down by means of a threaded connection or actuating screw 14 with a top control handle 15. It passes through an ear 16. Thus the screw member 14 is held against vertical movement. Its lower screw threaded end penetrates a knuckle or lug 17 of the rear extension 13 of the cross bar 12. Thus rotation of the knob 15 is effective bodily to raise and lower the cross bar 12 along the angles 11. If the screw 14 is rotated far enough in the release direction, the cross bar 12 is freed for downward removal. Each end of the cross bar carries a pivot pin 18 to which is pivoted a link 19 which carries the entire cutter bar structure. On each link 19 is a pin 20 which rotates in relation to 19 and is rigidly fastened to the cutter bar support, which includes a portion 21 which carries the cutter bar proper 22, which may be removably held, as by the screw 23. 24 is the transversely extending rear portion of the cutter bar support 21 which extends from side to side of the chassis. The coil spring 25, anchored at one end as at 26 on the cutter bar support and at 27 on the link 19, tends to rotate the cutter bar support, and thus thrust the cutter bar assembly against the adjustable stop 28 on the link 19. The adjustable stop engages the upward and forward extension 29 of the cutter bar support 21. Thus the relationship between the forward edge of the cutter bar 22 and the path of movement of the cutting edges of the blades 57 can be suitably adjusted. The link 19 is integral with a hub 30 which rotates about the extension 34a of the link 34 which holds the outer part of a bearing structure which includes the outer race 31, the inner race 32 and any suitable balls 33 between them. The open ends of the link 34, in the form of forks 35, are rotatable about the center line or axis of the below described supporting wheels. Riveted to the inner faces of the side plates 1 are hollow hubs or bearing sleeves 36 which on the exterior face of their inner ends receive the forks 35. The bores of the hubs 36 carry antifrictional rings 37 which rotatably receive the shafts 38 to which are riveted the wheel plates 39 with their cylindrical inwardly extending peripheral flanges 40. Within each flange 40 is positioned a ring gear 41. 42 is an exterior shallow channel which forms a rim to receive any suitable tire 43. Note that a sealing ring 44 is fastened to the exterior of the side plate 1 and has an outer edge 45 extending into the space between the members 40 and 42 to provide a seal and to prevent dirt or foreign material from penetrating between the wheel and chassis.

Figure 2:
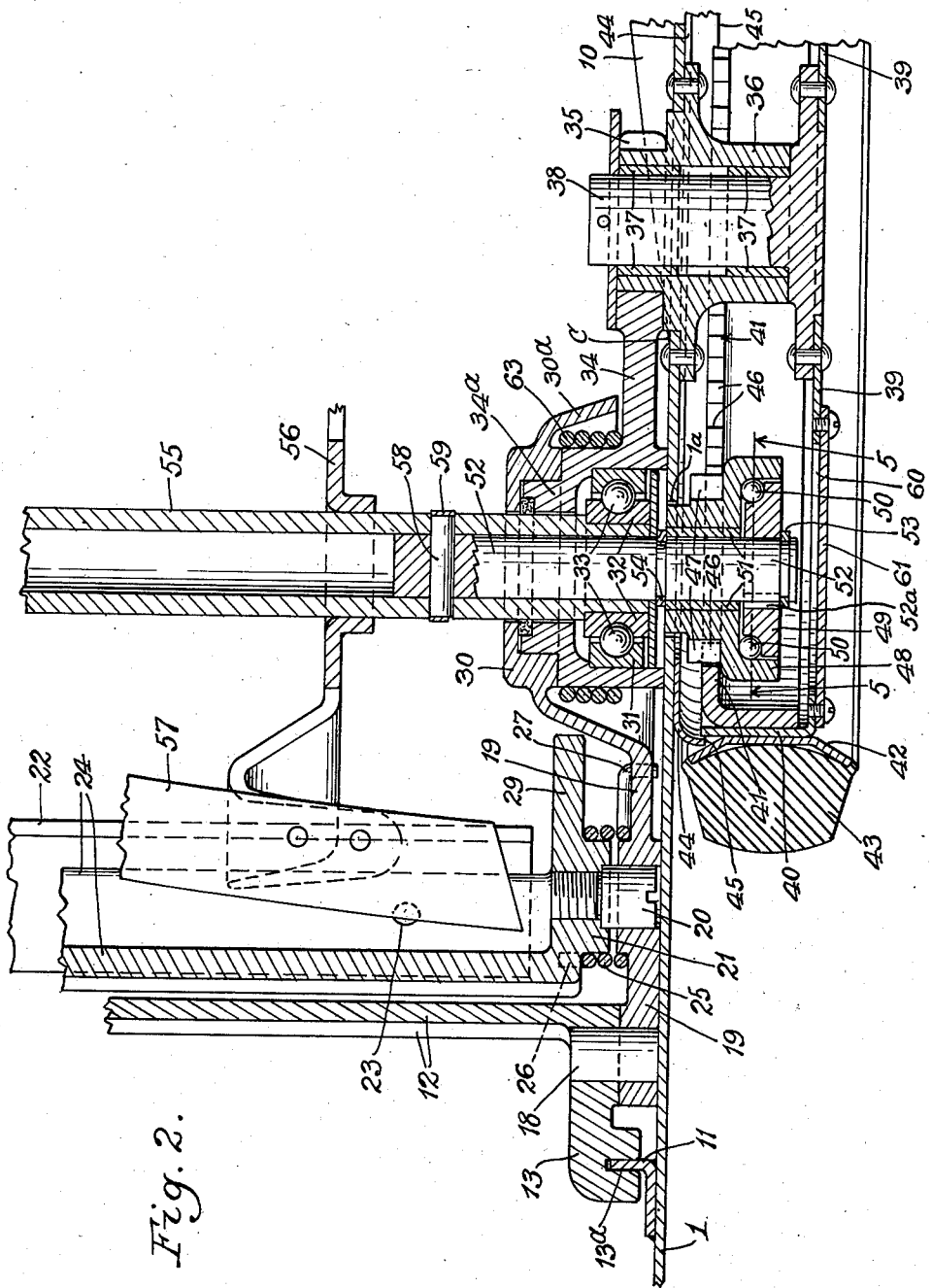
Figure 2 is a section on an enlarged scale on the line 2—2 of Figure 1.

When the structure is applied to a manual machine, the wheels may be rotated by a forward thrust on any suitable handle, or by any other means for causing advance movement of the chassis. Thus the ring 41 is rotated and its interior teeth 46 mesh with the exterior teeth 47 on the exterior working half 48 of a pinion or ratchet structure which is completed by the inner member 49 and any suitable balls 50. While a variety of different ratchets might be employed, the ratchet herein shown is highly efficient and substantially silent. It will be noted that the inner member 49 has a series of ball pockets 49a connected by surfaces of more or less spiral contour which, in the driving position of Figure 5, receive the balls 50. The outer or driving member 48 has idler pockets 48a and driving ledges or indentations 48b, separated by the more or less spiral surface 48c. Thus when the machine is given a retrograde movement, the balls are freed and may move to the pockets 48a and a free and substantially silent retrograde movement is permitted. 51 is a bushing for the member 48. 49 is keyed to the shaft 52 as at 52a. Lateral movement of the above members is prevented by the snap rings 53, 54 which engage the exterior of the shaft 52. 55 is a hollow tube which carries the spiders 56 on the ends of which are mounted any suitable cutter blades 57. The shaft 52 penetrates the hollow end of the tube 55 and is secured thereto by any suitable locking means, such as the cross pin 58 which is prevented from sliding out by any suitable snap ring 59. As will be clear from Figure 2 the shaft 52, which terminates in the hollow of the tube 55 at a point well inside of the side frame member 1, extends outwardly therethrough and into the interior of the wheel. Any suitable slot or aperture 1a may be employed, as shown in Figure 2, of suitable size and shape to permit arcuate movement of the cutter reel assembly about the center of rotation of the shaft 38 which support the ground engaging wheels. It will be understood that a similar structure is located at each end of the tube 55. Each wheel side plate 39 is cut away or opened as at 60, which hole may be covered by any suitable removable cover 61. When the cover 61 is removed, access can be had to the interior of the device; the snap ring 59 and the locking pin 58 may be removed and the shaft 52, with the parts attached to it may be withdrawn outwardly through the aperture 60.

It is important to keep a constant radius of contact between the teeth 47 and the teeth 46, with the teeth 46 bottoming on the teeth 47. To prevent play we use a spring 63 which tends to straighten out the links 19 and 34 and thereby forces the teeth 46 and 47 together and keeps them bottomed.

A wide variety of spiders may be employed to support the blades 57. We illustrated, however, a spider which includes a small central flat portion 90, preferably with an integral cylindrical sleeve 91 stamped out of it, to receive the hollow shaft 55. Extending from the flat portion 90 are a plurality of arms 92 which are rather sharply curved, as at 93, from the plane of the small central portion 90 and are recurved as at 94 to provide inclined end portions 95 which extend through and beyond the plane of the central portion 90, as shown in Figure 7. These end portions are generally rectilinear and are provided with apertures 96 to receive any suitable bolts or securing means for securing the blades 57. Thus the blades, instead of being directly supported against the plane portion 90 of the spider, are separated therefrom by intervening curved portions. The structure is under normal circumstances sufficiently rigid to prevent any relative displacement of the blades in relation to the shaft 55 or to each other. However, a slight yield is provided, to abnormal thrust, which provides a safety factor.

Where the present device is used as a manual mower we may employ a handle having a shaft 70 with fork ends 71. These ends are pivoted on interior pins 72. Note that the pivot of the fork ends are not concentric with the axis of rotation of the wheels. It is so located that a thrust against the handle tends to create increasing cutting force in the event that foreign material, such as a stick, gets between the cutter bar and the blades. Thus a continuing or increased thrust tends to snap the foreign material rather than to cause the machine to buck or rotate. This feature is advantageous particularly in cutting lawns where there may be tufts of thicker grass in various locations on the lawn. The proper point for the pin 72 is some point below a line between the end of the handle and the center of rotation of the chassis, when the device is being used. A substantial increase in ease of operation results from properly pivoting the handle to the chassis.

When the device is used as a draw or trailer or gang mower, the above described handle is not used, but the point of connection or traction with the mower or tractor is arranged to produce the same result. In the particular structure herein shown the center 72 is so positioned that the above described result will be obtained even if the lawn mower is pushed down a slope as steep as 30%, which is probably as steep a slope as the ordinary lawn mower has to travel.

Figure 3:
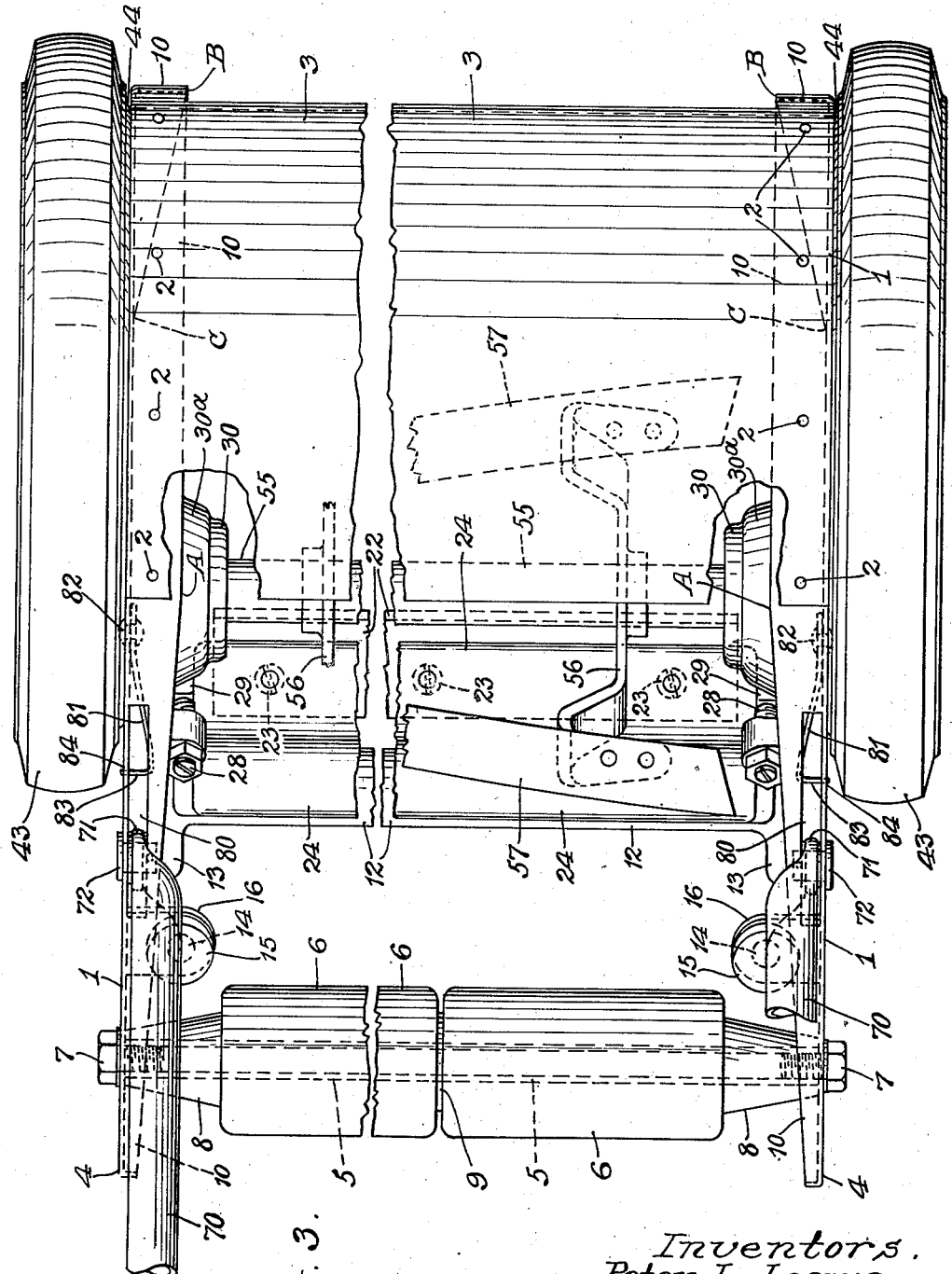
Figure 3 is a plan view with parts broken away.

The handle ends or forks 71 are flattened from tubular stock at their ends so that they can extend through the slot 80 which is formed in the flange 10. The pin 72 extends inwardly from the inner face of the side plate 1. The slot 80 is so proportioned as to provide satisfactory limits for the rotation of the handle in relation to the chassis. A spring stop 81 is fastened to the inner face of the side plate 1 as at 82 and has an end portion 83 which extends through a slot 84 in the side plate 1. The spring stop 81 normally keeps the position in which it is shown in Figure 3. When in that position it serves as an intermediate stop for the handle. When the handle is moved upwardly against it, it is at about the optimum position or angle for pushing the lawn mower. However, when it is desired to store the lawn mower with the handle in generally vertical position, the user can press with his finger on the spring and compress the spring 81, permitting the handle to be raised until it touches the upper end of the slot 80 in the flange 10, which preferably permits a movement slightly over the perpendicular, so that the handle will be gravitally held in substantially upright position. The stop may more or less yieldingly lock or hold the handle in its generally upright position. However, the thrust is sufficiently light so that the user can pull the handle down, past the spring into operating position, with a relatively slight force necessary. A relatively weak spring can be used for ease in operation. A fairly weak spring is strong enough to serve as a stop, even for lifting the lawn mower, because one end of the portion 83 is supported in the slot 84 and the other end is directly backed by the long extension of the spring secured as at 82 to the plate 1. Thus a strong abutment is provided which will not be damaged by any normal urge of the handle against it, even though the urge is sufficient to tilt or lift the chassis and mower as a whole.

It will be realized that, whereas, we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of the invention are as follows:

The handle 70 is pivoted at 72 to the chassis, in the present instance at a point to the rear of the axis of rotation of the supporting wheels, and somewhat below a line extending from the outer end of the handle to the axis of rotation of the supporting wheels. This promotes ease of operation, prevents bucking of the machine, and provides an excess cutting thrust or shearing force which is normally effective to cut even fairly large twigs if they get in between the bar 22 and the blades 57.

An important feature of the invention is the provision for ready adjustment of the cutting assembly toward and away from the ground level without interruption of the drive. The cutting bar support is raised and lowered along a generally rectilinear path, along the angle members 11. The transverse bar or support 12 moves in unison with the bearing knuckles or members 13 with their slots 13a. This results in a raising or lowering of the pins 18 which form one anchor of the supporting linkage structure for the cutting reel. The opposite anchor is the sleeve 36 the exterior of which receives the forks 35 of the links 34. However, raising or lowering of the pivot pins 18 does not interfere with the drive, because the links 19 and 34 are so pivoted to each other that no change in the drive results when the two links pivot somewhat in relation to each other in response to the raising or lowering of the pins 18. The center of the pinion teeth 47, merely moves somewhat about the axis defined by the hub 36. The interior teeth 46 of the ring gear 41 remain in mesh with the pinion teeth 47, and the drive is undisturbed. Thus, accompanying the rectilinear movement of the cutter bar 22, is the arcuate movement of adjustment of the pinion, made possible by the above described linkage. Since the links 34 pivot about the center of rotation of the driving ring gear 41, and since the links 34 carry the driven pinions, the center of the ring gear and of the driven pinions are always at a constant distance from each other.

The cutter bar and reel assemblies may readily be unitarily removed from the chassis. If the adjusting screws 14 are rotated so far in the release direction as to release the lugs 17, then one anchor of the linkage system is freed. If the snap rings 59 are removed and the pins 58 are withdrawn, then the stub shafts 52, and their associated parts, may be outwardly withdrawn through the apertures 60 of the wheel side plates 39. This then releases the shaft 55 with its spiders 56 for downward removal from the bottom of the chassis, a movement which is permitted by the open forked ends 35 of the links 34. Thus ready access can be had to the reel assembly and the cutter bar assembly and they may be inspected, cleaned, repaired, replaced and the blades resharpened.

An advantage of the structure is that the cutter assembly as a whole is separate from and readily removable from and readily adjustable in relation to the chassis, without receiving any transmission of stresses from any part of the chassis. The chassis itself constitutes a firm, powerful, simple structural member.

The tendency of the structure to foul is substantially avoided. The guard 44 prevents grass or other material from packing in about the wheel shafts. The ends of the cutter reel are also well protected by the member 30 and its projecting apron 30a which surrounds the spring 63.

The wheel structure shown herein is simple, economical and easy to manufacture, and extremely strong. The plate 39 with its cylindrical flange 40 is strengthened by the ring gear which fits within it and serves as a reinforcement. These two mutually reinforcing members are surrounded by the rim 42 which serves as a further reinforcement and which is strengthened by its side flanges offset from its more or less cylindrical center body, as will be clear from Figure 2.

We claim:

1. In a lawn mower, a chassis, ground engaging supporting and reel driving wheels mounted on said chassis for rotation about a common axis, a cutter reel assembly pivoted for adjustment about said axis and including reel supporting means, a reel rotatable thereon, a driving connection between said reel and said ground engaging wheels, effective at all stages of adjustment of said reel about the axis of rotation of said wheels, a cutter bar assembly and means for raising and lowering it in relation to said chassis, along a generally rectilinear path, while maintaining the cutter bar in predetermined angular relation to the ground, and a pivoted link connection between said cutter bar assembly and said cutting reel assembly adapted, in response to the raising or lowering of said cutter bar assembly to raise or lower said cutter reel assembly.

2. In a lawn mower, a chassis, ground engaging supporting and reel driving wheels mounted on said chassis for rotation about a common axis, a cutter reel assembly pivoted for adjustment about said axis and including reel supporting means, a reel rotatable thereon, a driving connection between said reel and said ground engaging wheels, effective at all stages of adjustment of said reel about the axis of rotation of said wheels, a cutter bar assembly and means for raising and lowering it in relation to said chassis, along a generally rectilinear path, while maintaining the cutter bar in predetermined angular relation to the ground, and a connection between said cutter bar assembly and said cutter reel assembly adapted, in response to the raising or lowering of said cutter bar assembly, to raise or lower said cutter reel assembly, including a pivoted link connection between said cutter bar assembly and said reel supporting means.

3. In a lawn mower, a chassis, ground engaging supporting and reel driving wheels mounted on said chassis for rotation about a common axis, a cutter reel assembly pivoted for adjustment about said axis and including reel supporting means, a reel rotatable thereon, a driving connection between said reel and said ground engaging wheels, effective at all stages of adjustment of said reel about the axis of rotation of said wheels, a cutter bar assembly and means for raising and lowering it in relation to said chassis, while maintaining the cutter bar in predetermined angular relation to the ground, and a connection between said cutter bar assembly and said cutter reel assembly, including a link connection between said cutter bar assembly and said reel supporting means, pivoted to said reel supporting means about an axis generally concentric with the axis of rotation of said reel.

4. In a lawn mower, a chassis, ground engaging supporting and reel driving wheels mounted on said chassis for rotation about a common axis, a cutter reel assembly pivoted for adjustment about said axis and including reel supporting means and a reel rotatable thereon and a linkage extending to the axis of said driving wheels, a driving connection between said reel and said ground engaging wheels, effective at all stages of adjustment of said reel about the axis of rotation of said wheels, a cutter bar assembly and means for raising and lowering it in relation to said chassis, while maintaining the cutter bar in predetermined angular relation to the ground, and a link connection between said cutter bar assembly and said cutter reel assembly adapted, in response to the raising or lowering of said cutter bar assembly, to rotate said cutter reel assembly, about said axis, said cutter bar assembly having a cutter bar adjustably mounted thereon.

5. In a lawn mower, a chassis, ground engaging supporting and reel driving wheels mounted on said chassis for rotation about a common axis, a cutter reel assembly pivoted for adjustment about said axis and including reel supporting means, a reel rotatable thereon and a linkage extending to the axis of said driving wheels, a driving connection between said reel and said ground engaging wheels, effective at all stages of adjustment of said reel about the axis of rotation of said wheels, a cutter bar assembly and means for raising and lowering it in relation to said chassis, while manitaining the cutter bar in predetermined angular relation to the ground, and a link connection between said cutter bar assembly and said cutter reel assembly adapted, in response to the raising or lowering of said cutter bar assembly, to rotate said cutter reel assembly about said axis, said cutter bar assembly having a cutter blade adjustably mounted thereon, the adjustment including stop means adjustable on the cutter bar assembly, and yielding means tending to urge said blade toward said stop means.

6. In a lawn mower, a chassis, ground engaging supporting and reel driving wheels mounted on said chassis for rotation about a common axis, a cutter reel assembly pivoted for adjustment about said axis and including reel supporting links, a reel rotatable on said links about an axis removed from the axis of the driving wheels, a driving connection between said reel and said ground engaging wheels, effective at all stages of adjustment of said links about the axis of rotation of said wheels, a cutter bar assembly and means for raising and lowering it in relation to said chassis while maintaining the cutter bar in predetermined angular relation to the ground and a connection between said cutter bar assembly and said reel supporting links, including links pivoted at one end to the cutter bar assembly and at the other end to said reel supporting links.

7. In a lawn mower, a chassis, ground engaging supporting and reel driving wheels mounted on said chassis for rotation about a common axis, a cutter reel assembly pivoted for adjustment about said axis and including reel supporting links, a reel rotatable on said links about an axis removed from the axis of the driving wheels, a driving connection between said reel and said ground engaging wheels, effective at all stages of adjustment of said links about the axis of rotation of said wheels, a cutter bar assembly and means for raising and lowering it in relation to said chassis while maintaining the cutter bar in predetermined angular relation to the ground and a connection between said cutter bar assembly and said reel supporting links, including links pivoted at one end to the cutter bar assembly and at the other end to said reel supporting links, concentrically with the axis of rotation of said reel.

8. In a lawn mower, a chassis having bearing sleeves located at each end thereof, ground engaging supporting and reel driving wheels mounted in said bearing sleeves, a cutter reel assembly including reel supporting links rotatably engaging said bearing sleeves, a reel rotatable on said links about an axis removed from the axis of the sleeves, a driving connection between said reel and said ground engaging wheels, effective at all angular positions of said links about said sleeves, a cutter bar and means for raising and lowering it on the chassis while maintaining it in predetermined angular relation to the ground and a linkage connection between said cutter bar and said reel assembly, said cutter bar and said reel assembly being readily removable from the chassis.

9. In a lawn mower, a chassis having bearing sleeves located at each end thereof, ground engaging supporting and reel driving wheels mounted in said bearing sleeves, a cutter reel assembly including reel supporting links rotatably engaging said bearing sleeves, a reel rotatable on said links about an axis removed from the axis of the sleeves, a driving connection between said reel and said ground engaging wheels, effective at all stages of adjustment of said links about said sleeves, said links having forked ends removably engaging exterior faces of said bearing sleeves, and means for normally holding said links against radial outward movement from said sleeves while permitting rotary adjustment about the sleeves.

10. In a lawn mower including a chassis and a cutter reel, means for removably supporting said cutter reel on said chassis including forked ended links, the forked ends of the links being rotatable about a predetermined axis of said chassis, said reel being rotatably mounted on said links about an axis remote from said forks, means for normally holding said links against radial movement while permitting their rotary movement and means for rotating said links and for thereby varying the height of the reel in relation to the ground.

11. In a lawn mower including a chassis and a cutter reel, means for removably supporting said cutter reel on said chassis including forked ended links, the forked ends of the links being rotatable about a predetermined axis on said chassis, said reel being rotatably mounted on said links about an axis remote from said forks, means for normally holding said links against radial movement while permitting their rotary movement, means for rotating said links and for thereby varying the height of the reel in relation to the ground, a cutter bar assembly extending between the ends of said chassis, means for adjusting it while maintaining a predetermined angular relation between the cutter bar and the ground, and an actuating connection between said cutter bar assembly and said links adapted to rotate said links and to move the axis of rotation of the reel in response to movement of said cutter bar assembly.

12. In a lawn mower, a chassis including end members and means for connecting them, ground engaging supporting and reel driving wheels mounted on said end members for rotation about a common axis, and having ring gears, reel supports adjustable on and removable from the chassis, a cutter reel mounted on said supports and including a shaft, stub shafts interfitting with the ends of said shaft and normally held against endwise movement and rotation in either direction in relation to said shaft, and pinions associated with said stub shafts, in mesh each with one of said ring gears, said pinions and stub shafts being unitarily outwardly removable from the ends of said shaft, and being aligned with said reel driving wheels, said wheels being apertured to permit the outward removal of said pinions and stub shafts therethrough.

13. In a lawn mower, a chassis including end members and means connecting them, ground engaging supporting wheels mounted on said end members for rotation about a common axis, each said wheel including a stub shaft, and means for rotatably mounting each said stub shaft on the chassis, including a sleeve mounted on one of said end members, and a cutter reel, and means for supporting it in relation to said chassis including supports connected to said sleeves.

14. In a lawn mower, a chassis including end members and means connecting them, ground engaging supporting wheels mounted on said end members for rotation about a common axis, each said wheel including a stub shaft, and means for rotatably mounting each said stub shaft on the chassis, including a sleeve mounted on one of said end members, and a cutter reel, and means for supporting it in relation to said chassis including links pivoted to said sleeves.

15. In a lawn mower, a chassis including end members and means connecting them, ground engaging supporting wheels mounted on said end members for rotation about a common axis, each said wheel including a stub shaft, and means for rotatably mounting each said stub shaft on the chassis, including a sleeve mounted on one of said end members, and a cutter reel, and means for supporting it in relation to said chassis including links pivoted to said sleeves, each said sleeve having an inner bearing surface for one of said stub shafts and an outer bearing surface for one of said links.

16. In a lawn mower, a chassis including end members and means connecting them, ground engaging supporting wheels mounted on said end members for rotation about a common axis, each said wheel including a stub shaft, and means for rotatably mounting each said stub shaft on the chassis, including a sleeve mounted on one of said end members, and a cutter reel, and means for supporting it in relation to said chassis including links pivoted to said sleeves, each said sleeve having an inner bearing surface for one of said stub shafts and an outer bearing surface for one of said links, said links having forked ends adapted to permit ready endwise removal of said links from said sleeves.

17. In a lawn mower, a frame, a pair of ground engaging wheels rotatably mounted on said frame for rotation about a common horizontal axis, a reel assembly including a reel and supporting means therefor, a cutter bar assembly and supporting means for said reel and cutter bar assemblies including links extending from said reel assembly to the axis of rotation of said ground engaging wheels and links extending from said cutter reel assembly to said cutter bar assembly, means for adjusting said cutter bar assembly along a predetermined path toward and away from the ground level and for thereby rotating said cutter reel assembly in relation both to said cutter bar assembly and to the axis of rotation of said ground engaging wheels, and a driving connection between said reel and said ground engaging wheels, effective at all positions of said reel assembly.

18. In a lawn mower, a frame, a pair of ground engaging wheels rotatably mounted on said frame for rotation about a common horizontal axis, a reel assembly including a reel and supporting means therefor, a cutter bar assembly and supporting means for said reel and cutter bar assemblies including links extending from said reel assembly to the axis of rotation of said ground engaging wheels and links extending from said cutter reel assembly to said cutter bar assembly, means for adjusting said cutter bar assembly along a predetermined path toward and away from the ground level and for thereby rotating said cutter reel assembly in relation both to said cutter bar assembly and to the axis of rotation of said ground engaging wheels, and a driving connection between said reel and said ground engaging wheels, effective at all positions of said reel assembly, the adjusting means for the cutter bar assembly including a guide on the frame, said cutter bar assembly including an element slidably movable in said guide and means for moving it including a screw having an external, readily accessible manual actuating portion.

19. In a lawn mower, a frame, a pair of ground engaging wheels rotatably mounted on said frame for rotation about a common horizontal axis, a reel assembly including a reel and supporting means therefor, a cutter bar assembly and supporting means for said reel and cutter bar assemblies including links extending from said reel assembly to the axis of rotation of said ground engaging wheels and links extending from said cutter reel assembly to said cutter bar assembly, means for adjusting said cutter bar assembly along a predetermined path toward and away from the ground level and for thereby rotating said cutter reel assembly in relation both to said cutter bar assembly and to the axis of rotation of said ground engaging wheels, and a driving connection between said reel and said ground engaging wheels, effective at all positions of said reel assembly, the adjusting means for the cutter bar assembly including a guide on the frame, said cutter bar assembly including an element slidably movable in said guide and means for moving it including a screw having an external, readily accessible manual actuating portion located adjacent an upper portion of the frame.

20. In a lawn mower, a frame, a pair of ground engaging wheels rotatably mounted on said frame for rotation about a common horizontal axis, a reel assembly including a reel and supporting means therefor, a cutter bar assembly and supporting means for said reel and cutter bar assemblies including links extending from said reel assembly to the axis of rotation of said ground engaging wheels and links extending from said cutter reel assembly to said cutter bar assembly, means for adjusting said cutter bar assembly along a predetermined path toward and away from the ground level and for thereby rotating said cutter reel assembly in relation both to said cutter bar assembly and to the axis of rotation of said ground engaging wheels, and a driving connection between said reel and said ground engaging wheels, effective at all positions of said reel assembly, the adjusting means for the cutter bar assembly including a generally rectilinear, generally upright guide on the frame, said cutter bar assembly including an element slidably movable in said guide and means for moving it including a screw having an external, readily accessible manual actuating portion.

21. In a lawn mower, a frame, a pair of ground engaging wheels rotatably mounted on said frame for rotation about a common horizontal axis, a reel assembly including a reel and supporting means therefor, a cutter bar assembly and supporting means for said reel and cutter bar assemblies including links extending from said reel assembly to the axis of rotation of said ground engaging wheels and links extending from said cutter reel assembly to said cutter bar assembly, said sets of links being concentrically rotatable in relation to said cutter reel assembly, means for adjusting said cutter bar assembly along a predetermined path toward and away from the ground level and for thereby rotating said cutter reel assembly, means for adjusting said cutter bar assembly along a generally rectilinear path toward and away from the ground level and for thereby rotating to said cutter reel assembly in relation both to said cutter bar assembly and to the axis of rotation of said ground engaging wheels, and a driving connection between said reel and said ground engaging wheels, effective at all positions of said reel assembly.

22. In a lawn mower, a frame, a pair of ground engaging wheels rotatably mounted on said frame for rotation about a common horizontal axis, a reel assembly including a reel and supporting means therefor, a cutter bar assembly and supporting means for said reel and cutter bar assemblies including links extending from said reel assembly to the axis of rotation of said ground engaging wheels and terminating in forked ends, said frame having inwardly extending bearing means for said forked ends, concentric with the axis of rotation of said ground engaging wheels, and links extending from said cutter reel assembly to said cutter bar assembly, means for adjusting said cutter bar assembly along a predetermined path toward and away from the ground level and for thereby rotating said cutter reel assembly in relation both to said cutter bar assembly and to the axis of rotation of said ground engaging wheels, and a driving connection between said reel and said ground engaging wheels, effective at all positions of said reel assembly.

23. In a lawn mower, a frame, a pair of ground engaging wheels rotatably mounted on said frame for rotation about a common horizontal axis, a reel assembly including a reel and supporting means therefor, a cutter bar assembly and supporting means for said reel and cutter bar assemblies including links extending from said reel assembly to the axis of rotation of said ground engaging wheels and links extending from said cutter reel assembly to said cutter bar assembly, means for adjusting said cutter bar assembly, said adjusting means being movable along a generally rectilinear path toward and away from the ground level and for thereby rotating said cutter reel assembly in relation both to said cutter bar assembly and to the axis of rotation of said ground engaging wheels, and a driving connection between said reel and said ground engaging wheels, effective at all positions of said reel assembly.

PETER L. LOEWE.
EUGENE L. BOYCE.